(12) United States Patent
Campagna et al.

(10) Patent No.: US 10,934,774 B2
(45) Date of Patent: Mar. 2, 2021

(54) AUTOMATIC LIMIT DETECTION FOR HORIZONTAL SHEERS STYLE ROLLER SHADE

(71) Applicant: Crestron Electronics, Inc., Rockleigh, NJ (US)

(72) Inventors: Michael Campagna, Woodcliff Lake, NJ (US); Benjamin Slivka, Hillsdale, NJ (US); Luis J. Rivera, Dumont, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 398 days.

(21) Appl. No.: 16/116,473

(22) Filed: Aug. 29, 2018

(65) Prior Publication Data

US 2020/0071995 A1     Mar. 5, 2020

(51) Int. Cl.
| | | |
|---|---|---|
| *E06B 9/72* | (2006.01) | |
| *E06B 9/42* | (2006.01) | |
| *E06B 9/264* | (2006.01) | |
| *E06B 9/68* | (2006.01) | |
| *E06B 9/24* | (2006.01) | |

(52) U.S. Cl.
CPC ............... *E06B 9/72* (2013.01); *E06B 9/264* (2013.01); *E06B 9/42* (2013.01); *E06B 2009/2435* (2013.01); *E06B 2009/6827* (2013.01)

(58) Field of Classification Search
CPC ...... E06B 9/72; E06B 9/68; E06B 2009/6809; E06B 2009/6818; E06B 9/6845; E06B 2009/689; E06B 2009/2435; E06B 9/26; E06B 2009/285; E06B 9/24; E06B 9/42
See application file for complete search history.

(56) References Cited

U.S. PATENT DOCUMENTS

| | | |
|---|---|---|
| 6,299,115 B1 | 10/2001 | Kovach et al. |
| 6,688,368 B2 | 2/2004 | Kovach et al. |
| 7,147,029 B2 | 12/2006 | Kovach et al. |
| 7,401,634 B2 | 7/2008 | Kovach et al. |
| 7,466,090 B2 | 12/2008 | Meewis et al. |
| 7,719,215 B2 | 5/2010 | Meewis et al. |

(Continued)

*Primary Examiner* — Johnnie A. Shablack
*Assistant Examiner* — Jeremy C Ramsey
(74) *Attorney, Agent, or Firm* — Crestron Electronics, Inc.

(57) ABSTRACT

A system and method for automatically determining at least one lower limit of a horizontal sheers style roller shade. The roller shade comprising a roller tube, a shade material attached to the roller tube and comprising a first vertical layer interconnected to a second vertical layer via a plurality of horizontal vanes, a motor adapted to rotate the roller tube, a current sensing circuit adapted to detect current levels of the motor, and a controller adapted to control the motor and comprising at least one memory. The controller determines at least one lower limit by driving the motor in a first direction, receiving current levels from the current sensing circuit, observing current level profile of the received current levels, detecting a point of change in the current level profile, and using the point of change to set at least one of a lower tilt closed limit and a lower tilt open limit. During normal operation, the controller drives the motor between the upper limit and the lower tilt closed limit to raise or lower the shade material and between the lower tilt closed limit and the lower tilt open limit to open or close the vanes.

34 Claims, 6 Drawing Sheets

(56) References Cited

U.S. PATENT DOCUMENTS

| | | | |
|---|---|---|---|
| 7,982,422 B2* | 7/2011 | Meewis | E06B 9/262 |
| | | | 318/466 |
| 9,611,689 B2* | 4/2017 | Blair | E06B 9/34 |
| 10,107,033 B2* | 10/2018 | Mugnier | G01R 19/0046 |
| 10,174,553 B2* | 1/2019 | Mugnier | E06B 9/72 |
| 10,196,856 B2* | 2/2019 | Desfossez | E06B 9/40 |
| 2006/0278346 A1 | 12/2006 | Kovach et al. | |
| 2014/0262078 A1* | 9/2014 | Colson | E06B 9/68 |
| | | | 160/310 |
| 2017/0159355 A1 | 6/2017 | Blair et al. | |

* cited by examiner

AUTOMATIC LIMIT DETECTION FOR HORIZONTAL SHEERS STYLE ROLLER SHADE

BACKGROUND OF THE INVENTION

Technical Field

Aspects of the embodiments relate to roller shades, and more particularly to systems, methods, and modes for automatically detecting at least one tilting limit for a horizontal sheers style roller shade.

Background Art

Roller shades are effective in screening windows, doors, or the like, to achieve privacy and thermal effects. A roller shade typically includes a rectangular shade material, such as fabric, attached at its top end to a cylindrical rotating tube, called a roller tube, and at an opposite bottom end to a hem bar. The shade material is wrapped around the roller tube. The roller tube is rotated, either manually or via an electric motor, in a first direction to roll down the shade material to cover a window and in a second direction to roll up the shade material to uncover the window. Horizontal sheers style roller shade feature horizontal fabric vanes attached between two layers of sheer, knitted fabric. The fabric can be raised for an unobstructed view or lowered to block or soften the view. When fully lowered, the vanes can be tilted to be opened or closed to filter the amount of daylight and conceal the view.

The horizontal sheers style roller shades can be motorized and controlled using a choice of keypads, touch screens, handheld remotes, and mobile devices. Motorized operation enables sophisticated automation as part of a complete lighting control system, with the ability to set and recall lighting and shading scenes at the press of a button or according to a schedule. For motorized operation, however, the motor controller needs to be preset with various position limits to operate properly. These limits include an upper limit (where the shade material is fully wrapped about the roller tube), a lower limit with closed vanes, and a lower limit with opened vanes. These limits may be set in the factory or at the installation site visually. However, visual preset setting is subjective, resulting in inconsistencies between shades, which can become unsightly when the shades are installed side by side. The other problem is that each shade will generally have different preset limits since they will change depending on the radius and length of the roller shade, the type, width, length, thickness and weight of the shade material, and the size and weight of the hem bar.

Accordingly, a need has arisen for automatically detecting at least one tilting limit for horizontal sheers style roller shades that can be used in any sized and shade material selection of a horizontal sheers style roller shade.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for automatically detecting at least one tilting limit for horizontal sheers style roller shades that can be used in any sized and shade material selection of a horizontal sheers style roller shade.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of Invention

According to one aspect of the embodiments a horizontal sheers style roller shade is provided. The roller shade comprises a roller tube, a shade material attached to the roller tube and comprising a first vertical layer interconnected to a second vertical layer via a plurality of horizontal vanes, a motor adapted to rotate the roller tube, a current sensing circuit adapted to detect current levels of the motor, and a controller adapted to control the motor and comprising at least one memory. The memory is adapted to store an upper limit. The controller is adapted to automatically determine at least one lower limit by: driving the motor in a first direction, receiving current levels from the current sensing circuit, observing current level profile of the received current levels, detecting a point of change in the current level profile, and using the point of change to set at least one of a lower tilt closed limit and a lower tilt open limit. During normal operation, the controller drives the motor between the upper limit and the lower tilt closed limit to raise or lower the shade material and between the lower tilt closed limit and the lower tilt open limit to open or close the vanes.

According to an embodiment, the upper limit may be manually set by a user. At the upper limit the shade material may be substantially wrapped about the roller tube. According to a further embodiment, the controller drives the motor to determine the at least one lower limit at a speed lower than a speed used during normal operation of the roller shade. The controller may drive the motor to determine the at least one lower limit using trapezoidal commutation.

According to an embodiment, prior to driving the motor in the first direction, a user may direct the controller to drive the motor to a position where the shade material is lowered and the vanes are substantially fully opened. Driving the motor in the first direction may cause the vanes to close and the shade material to raise. The controller may set the point of change as the lower tilt closed limit. The point of change may represent a point where the vanes stop closing and the shade material starts to raise. According to one embodiment, the controller may set the lower tilt open limit by adding a predetermined number of tilt units to the point of change. The predetermined number of tilt units may comprise about one half of the roller tube revolution. According to another embodiment, the controller may store the position directed by the user as the lower tilt open limit.

According to an embodiment, the controller may observe the current level profile of the received current levels by monitoring a shape of the current level profile. According to another embodiment, the controller may observe the current level profile by plotting the received current levels on a chart and determining the shape of the current level profile. According to a further embodiment, the controller may observe the current level profile by determining a slope of the current level profile and where the controller detects a change in the current level profile by detecting a change in the slope of the current level profile. The controller may detect a change in the current level profile when a change in the slope of the current level profile exceeds a change threshold. According to another embodiment, the controller may detect a change in the current level profile when the current level profile changes above a change threshold. According to an embodiment, the controller may be adapted to repeatedly drive the motor in the first direction to detect a plurality of points of change in the current level profile and use an average of the plurality of points of change to set at least one of the lower tilt closed limit and the lower tilt open limit.

According to another embodiment, the controller may be adapted to drive the motor in the first direction from the upper limit. Driving the motor in the first direction may cause the shade material to lower until the shade material is fully unwrapped from the roller tube, the horizontal vanes get opened and then closed, and the shade material then raises. According to one embodiment, the controller may set the lower tilt open limit by subtracting a first predetermined number of tilt units from the point of change and may set the lower tilt closed limit by subtracting a second predetermined number of tilt units from the point of change. The first predetermined number of tilt units may comprise about one half of the roller tube revolution and the second predetermined number of tilt units may comprise about one roller tube revolution. According to another embodiment, the point of change may comprise a first point of change, and after detecting the first point of change in the current level profile, the controller may be further adapted to: driving the motor in a second direction, receiving current levels from the current sensing circuit, observing current level profile of the received current levels, and detecting a second point of change in the current level profile. The controller may use the first point of change and the second point of change to set the lower tilt closed limit and the lower tilt open limit. According to one embodiment, the controller may set the lower tilt open limit by adding a predetermined number of tilt units to the second point of change. According to another embodiment, the controller may set the lower tilt open limit by subtracting a predetermined number of tilt units from the first point of change. According to yet another embodiment, the controller may set the lower tilt open limit at a predetermined point between the first and second points of change. The controller mat set the lower tilt open limit at a midpoint between the first and second points of change.

According to an embodiment, the controller may be adapted to repeatedly drive the motor in the first and second directions to detect a set of first points of change and a set of second points of change in the current level profile and use an average of each set of first and second points of change to set the lower tilt closed limit and the lower tilt open limit. According to a further embodiment, the memory may be further adapted to store a predetermined number of tilt units, and the controller may be further adapted to: repeatedly drive the motor in the first and second directions to detect a plurality of sets of first and second points of change, determine a number of tilt units between each set of first and second points of change, and use a set of first and second points of change with determined number of tilt units that correlates with the stored predetermined number of tilt units to set the lower tilt closed limit and the lower tilt open limit.

According to another aspect of the embodiment, a horizontal sheers style roller shade is provided comprising: a roller tube, a shade material attached to the roller tube and comprising a first vertical layer interconnected to a second vertical layer via a plurality of horizontal vanes, a motor adapted to rotate the roller tube, a current sensing circuit adapted to detect current levels of the motor, and a controller adapted to control the motor and comprising at least one memory. The memory is adapted to store an upper limit manually set by a user. The controller is adapted to automatically determine a lower tilt closed limit and a lower tilt open limit by: driving the motor from the upper limit in a first direction, receiving current levels from the current sensing circuit, observing current level profile of the received current levels, detecting a point of change in the current level profile, and using the point of change to set the lower tilt closed limit and the lower tilt open limit. During normal operation, the controller drives the motor between the upper limit and the lower tilt closed limit to raise or lower the shade material and between the lower tilt closed limit and the lower tilt open limit to open or close the vanes.

According to a further aspect of the embodiments, a horizontal sheers style roller shade is provided comprising: a roller tube, a shade material attached to the roller tube and comprising a first vertical layer interconnected to a second vertical layer via a plurality of horizontal vanes, a motor adapted to rotate the roller tube, a current sensing circuit adapted to detect current levels of the motor, and a controller adapted to control the motor and comprising at least one memory. The memory is adapted to store an upper limit manually set by a user. The controller is adapted to automatically determine a lower tilt closed limit and a lower tilt open limit by driving the motor from the upper limit in a first direction, and during travel in the first direction: receiving current levels from the current sensing circuit, observing current level profile of the receive current levels, and detecting a first point of change in the current level profile. The controller is further adapted to driving the motor in a second direction, and during travel in the second direction: receiving current levels from the current sensing circuit, observing current level profile of the received current levels, detecting a second point of change in the current level profile, and using the first and the second points of change to set the lower tilt closed limit and the lower tilt open limit. During normal operation, the controller drives the motor between the upper limit and the lower tilt closed limit to raise or lower the shade material and between the lower tilt closed limit and the lower tilt open limit to open or close the vanes.

According to yet another aspect of the embodiments, a horizontal sheers style roller shade is provided comprising a roller tube, a shade material attached to the roller tube and comprising a first vertical layer interconnected to a second vertical layer via a plurality of horizontal vanes, a motor adapted to rotate the roller tube, a current sensing circuit adapted to detect current levels of the motor, and a controller adapted to control the motor and comprising at least one memory. The memory is adapted to store an upper limit and a lower tilt open limit manually set by a user. The controller is adapted to automatically determine a lower tilt closed limit by: driving the motor in a first direction, receiving current levels from the current sensing circuit, observing current level profile of the received current levels, detecting a point of change in the current level profile, and using the point of change to set the lower tilt closed limit. During normal operation, the controller drives the motor between the upper limit and the lower tilt closed limit to raise or lower the shade material and between the lower tilt closed limit and the lower tilt open limit to open or close the vanes.

According to another aspect of the embodiments, a method is provided of automatically determining at least one lower limit of a horizontal sheers style roller shade. The roller shade comprises a roller tube, a shade material attached to the roller tube and comprising a first vertical layer interconnected to a second vertical layer via a plurality of horizontal vanes, a motor adapted to rotate the roller tube, and a current sensing circuit adapted to detect current levels of the motor. The method comprises the steps of: driving the motor in a first direction, receiving current levels from the current sensing circuit, observing current level profile of the received current levels, detecting a point of change in the current level profile, and using the point of change to set at least one of a lower tilt closed limit and a lower tilt open limit. During normal operation, driving the motor between the upper limit and the lower tilt closed limit to raise or lower the shade material and between the lower tilt closed limit and the lower tilt open limit to open or close the vanes.

According to another aspect of the embodiments, a method is provided of automatically determining at least one lower limit of a horizontal sheers style roller shade. The roller shade comprises a roller tube, a shade material attached to the roller tube and comprising a first vertical layer interconnected to a second vertical layer via a plurality of horizontal vanes, a motor adapted to rotate the roller tube, and a current sensing circuit adapted to detect current levels of the motor. The method comprises the steps of: storing an upper limit, driving the motor from the upper limit in a first direction, receiving current levels from the current sensing circuit, observing current level profile of the received current levels, detecting a point of change in the current level profile, and using the point of change to set the lower tilt closed limit and the lower tilt open limit. During normal operation, driving the motor between the upper limit and the lower tilt closed limit to raise or lower the shade material and between the lower tilt closed limit and the lower tilt open limit to open or close the vanes.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

Brief Description of the Several Views of the Drawings

Figure 1:
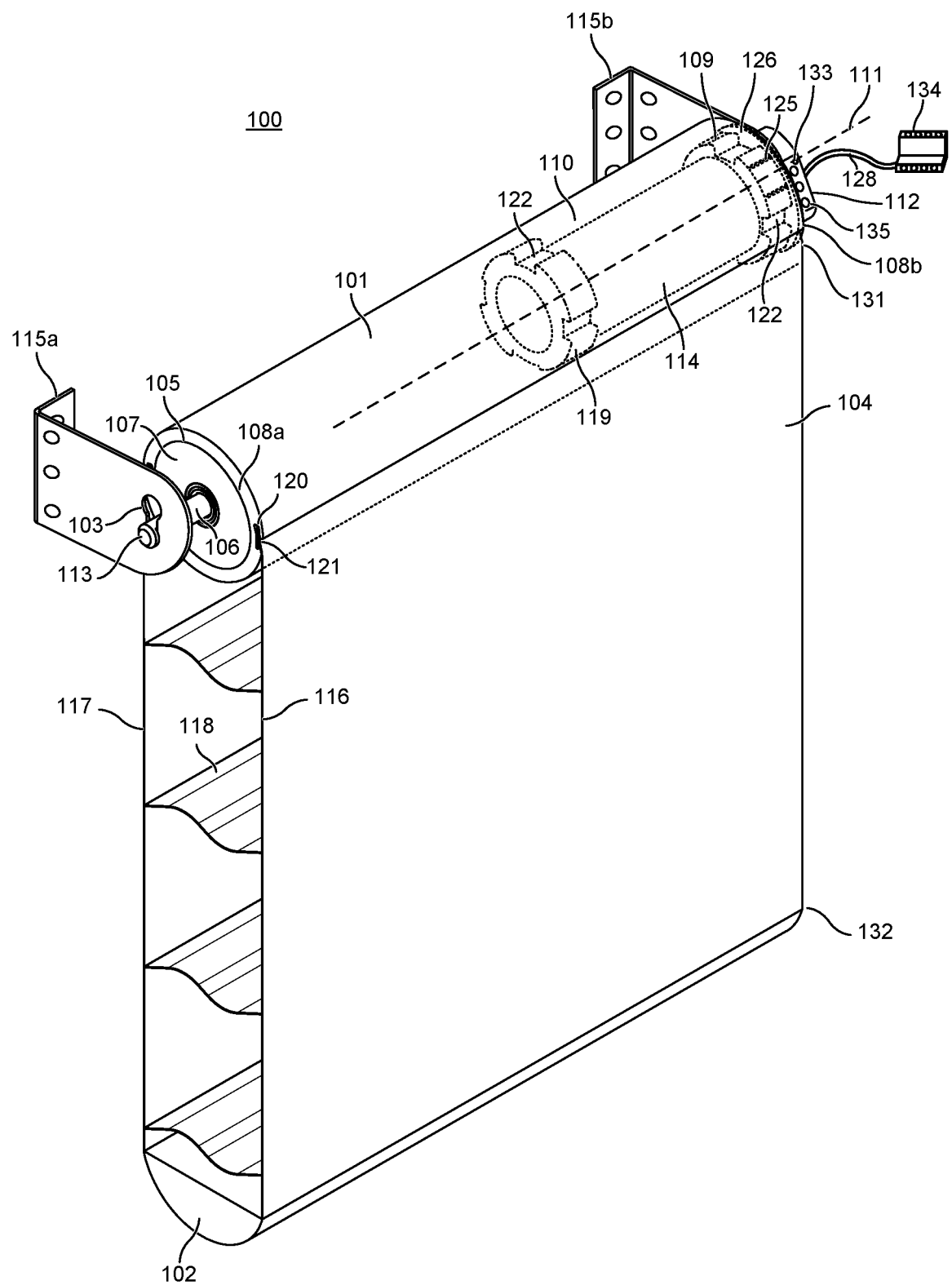

FIG. 1 illustrates a front perspective view of a horizontal sheers style roller shade according to one aspect of the embodiments.

Figure 2:
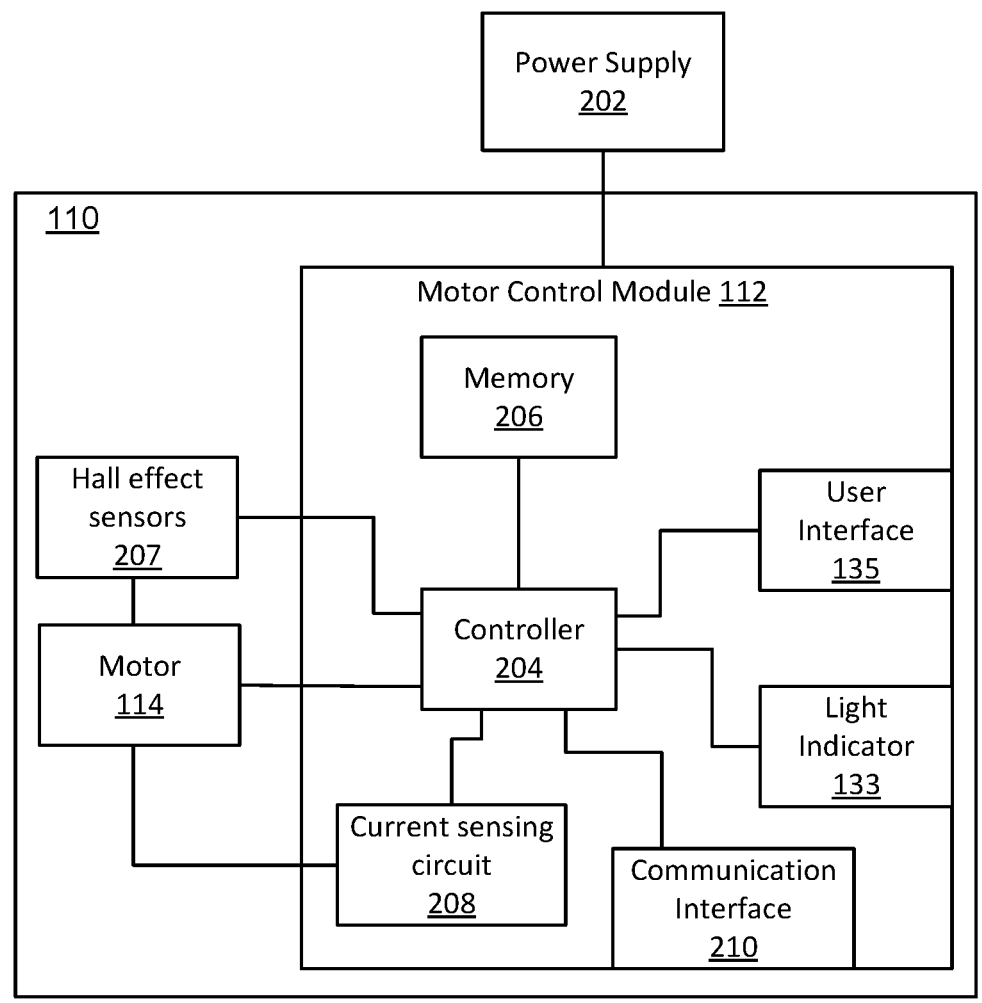

FIG. 2 illustrates a block diagram of a motor drive unit according to one aspect of the embodiments.

Figure 3:
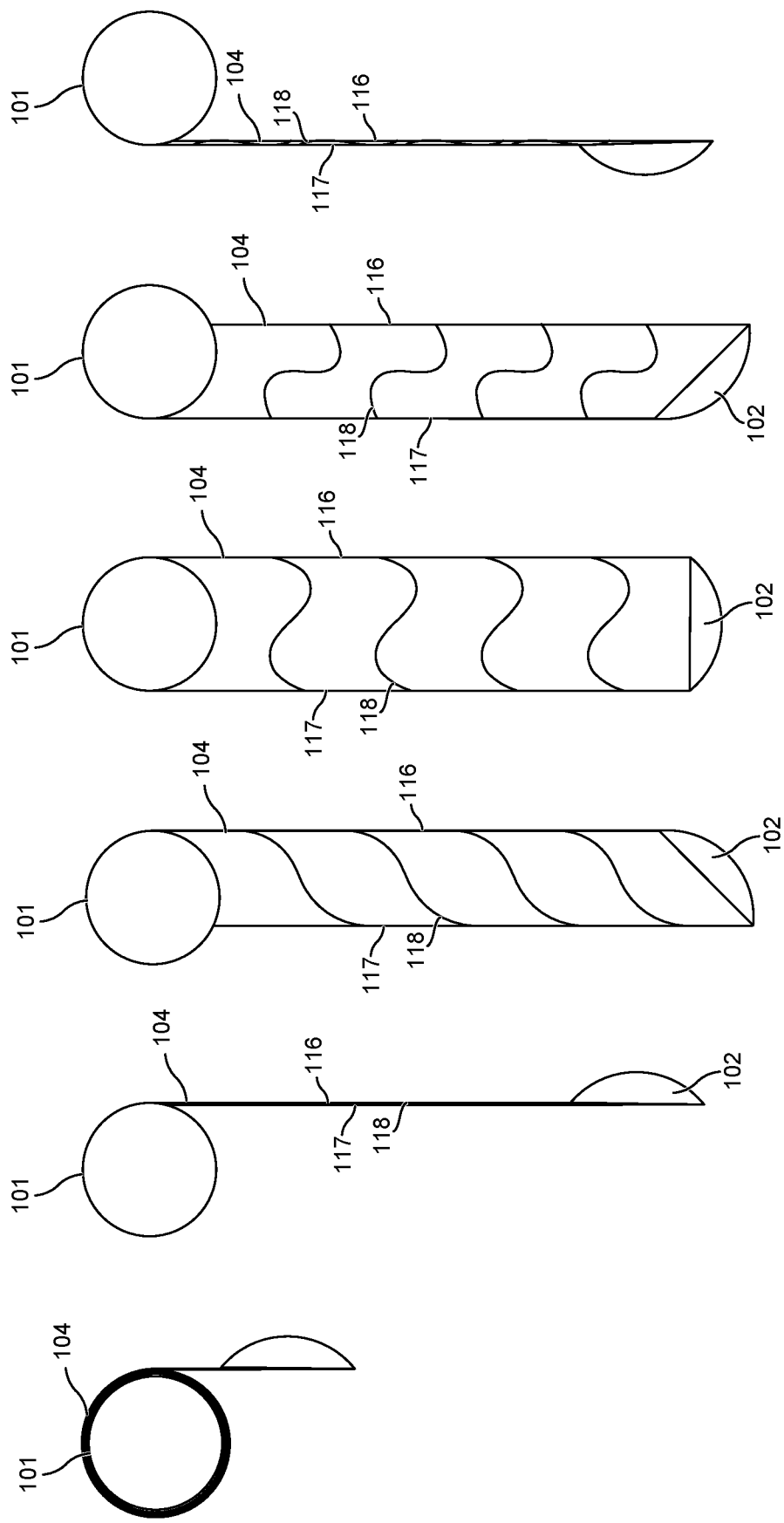

FIG. 3A illustrates the roller shade in raised position representing the upper limit where shade material is fully opened and substantially fully rolled about the roller tube, according to one aspect of the embodiments.

FIG. 3B illustrates the roller shade in a lowered position with closed vanes, representing the lower tilt closed limit where the shade material is fully lowered or unraveled from the roller tube but without opening the vanes, according to one aspect of the embodiments.

FIG. 3C illustrates the roller shade in the lowered position where the vanes are partially opened, according to one aspect of the embodiments.

FIG. 3D illustrates the roller shade in a lowered position with fully opened vanes representing the lower tilt open limit, according to one aspect of the embodiments.

FIG. 3E illustrate the roller shade in a lowered position with the vanes tilted in a backward direction when the roller shade continues to rotate beyond the fully opened position of FIG. 3D, according to one aspect of the embodiments.

FIG. 3F illustrates the roller shade in a lowered position where the vanes are tilted and fully closed in a backward direction when the roller shade continues to rotate beyond the partially opened position of FIG. 3E, according to one aspect of the embodiments.

Figure 4:
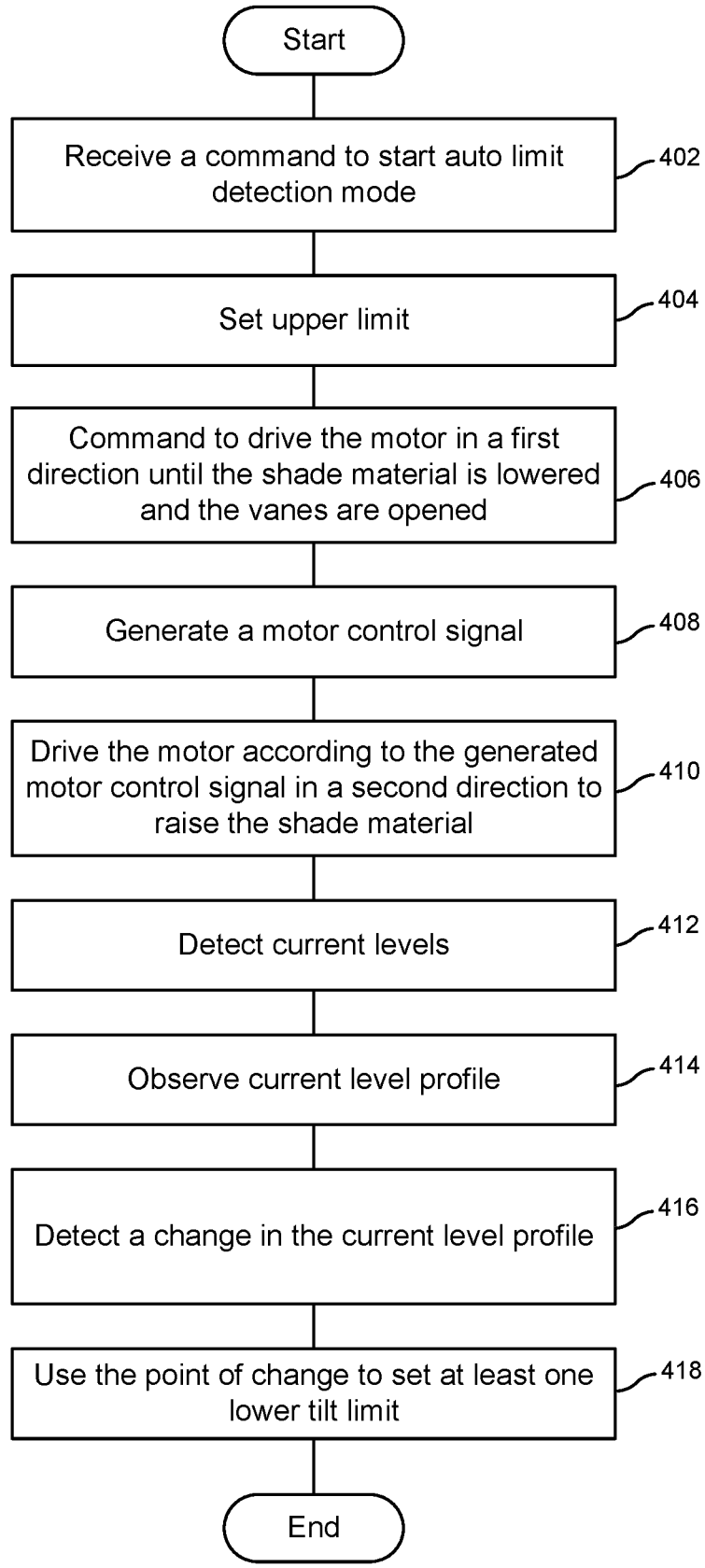

FIG. 4 shows a flowchart illustrating the steps for a method of automatically detecting and setting one or more lower tilt limits according to one aspect of the embodiments.

Figure 5:
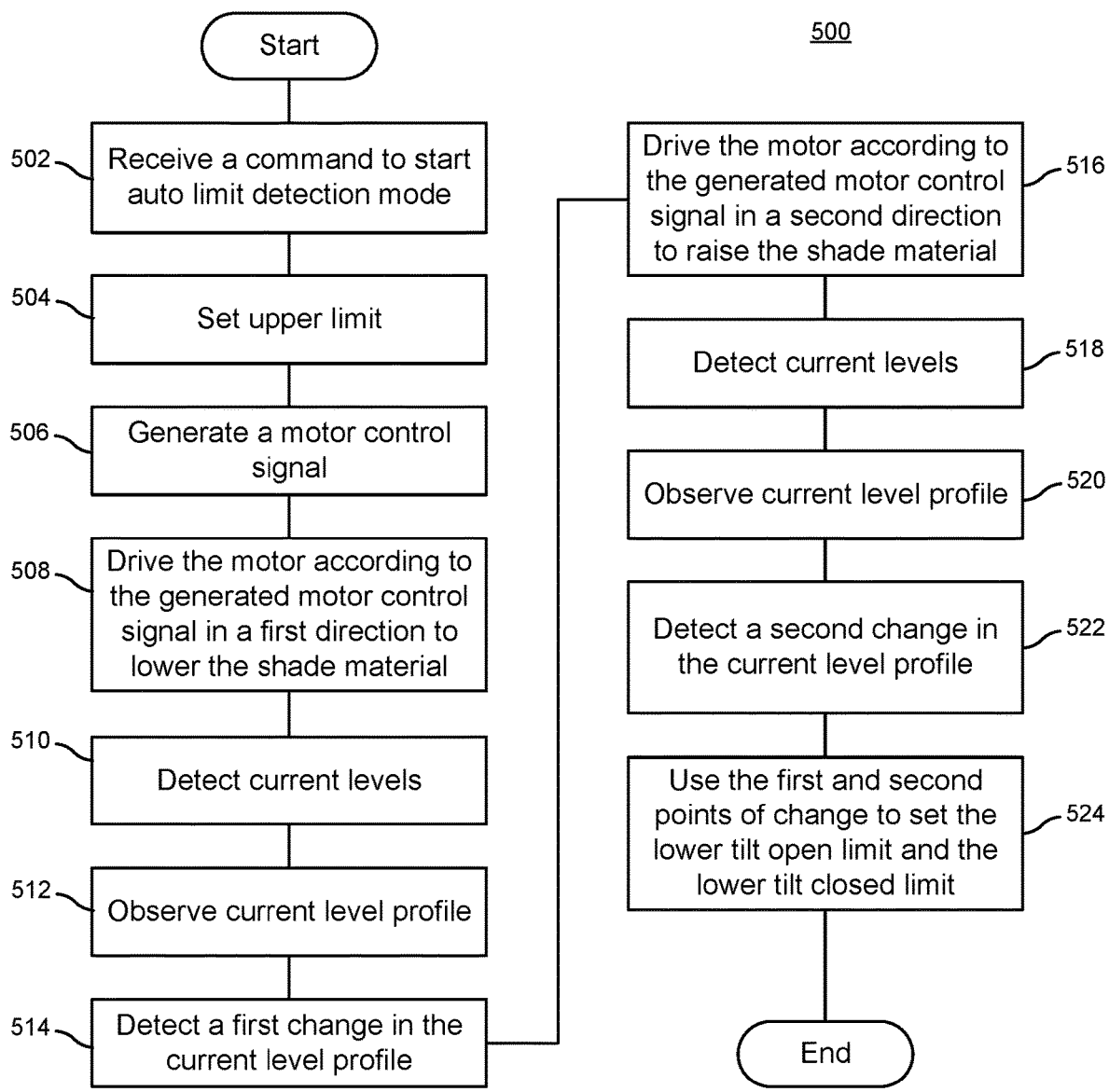

FIG. 5 shows a flowchart illustrating the steps for a method of automatically detecting and setting the lower tilt open and closed limits according to one aspect of the embodiments.

Figure 6:
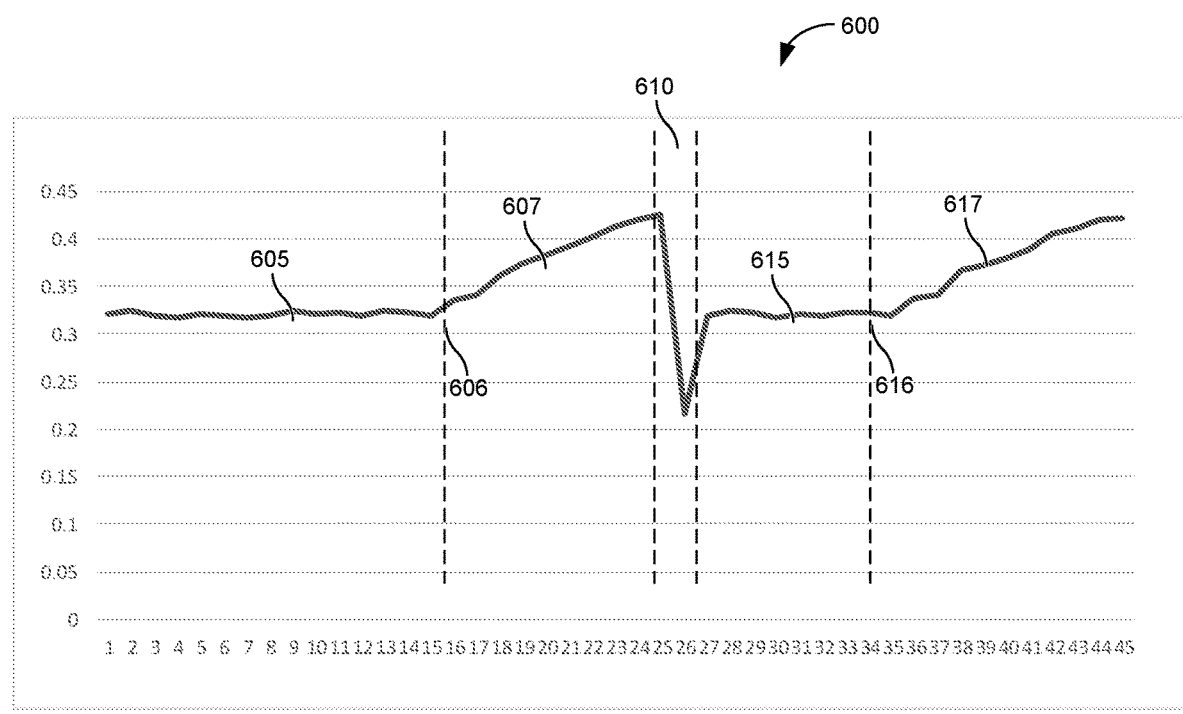

FIG. 6 shows a diagram illustrating a current level curve comprising current levels detected by a current sensing circuit during shade travel for a clutch based roller shade, according to one aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.

100 Roller Shade
101 Roller Tube
102 Hem Bar
103 Keyhole
104 Shade Material
105 Idler Assembly
106 Idler Pin
107 Idler Body
108a First End
108b Second End
109 Crown Adapter
110 Motor drive unit
111 Longitudinal Axis
112 Motor Control Module
113 Pin Tip
114 Motor
115a First Mounting Bracket
115b Second Mounting Bracket
116 First Vertical Layer
117 Second Vertical Layer
118 Horizontal Vanes
119 Drive Wheel
120 Channel
121 Retaining Member
122 Channels
125 Teeth
126 Flange
128 Power Cord
133 Light Indicator
134 Terminal Block
135 User Interface
200 Block Diagram of the Motor drive unit
202 Power Supply
204 Controller
206 Memory
207 Hall Effect Sensors
208 Current Sensing Circuit
210 Communication Interface
400 A Flowchart Illustrating the Steps for a Method of Automatically Detecting and Setting One or More Lower Tilt Limits
402-418 Steps of Flowchart 400
500 A Flowchart Illustrating the Steps for a Method of Automatically Detecting and Setting the Lower Tilt Open and Closed Limits
502-524 Steps of Flowchart 500
600 Current Level Curve
605 Section of Current Levels during Lowering and/or Tilting of the Shade Material in a First Direction
606 Point of Change in Current Level in a First Direction
607 Section of Current Levels during Raising of the Shade Material in a First Direction
610 Section of Current Levels during Reversal of the Shade Material
615 Section of Current Levels during Lowering and/or Tilting of the Shade Material in a Second Direction
616 Point of Change in Current Level in a Second Direction
617 Section of Current Levels during Raising of the Shade Material in a Second Direction List of Acronyms Used in the Specification in Alphabetical Order The following is a list of the acronyms used in the specification in alphabetical order.
AC Alternating Current
ASIC Application Specific Integrated Circuit
BLDC Brushless Direct Current
CAT5 Category 5 Cable
DC Direct Current
IR Infrared
LAN Local Area Network
LED Light Emitting Diode
PoE Power over Ethernet
RAM Random-Access Memory
RF Radio Frequency
ROM Read-Only Memory
RPM Revolutions per Minute
V Volt/Voltage Mode(s) for Carrying Out the Invention For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of roller shades, but is not limited thereto, except as may be set forth expressly in the appended claims. While the roller shade is described herein for covering a window, the roller shade may be used to cover doors, wall openings, or the like. The embodiments described herein may further be adapted in other types of window or door coverings, such as inverted rollers, Roman shades, Austrian shades, pleated shades, blinds, shutters, skylight shades, garage doors, or the like.

Referring to FIG. 1, there is shown a front perspective view of a roller shade, and more particularly a horizontal sheers style roller shade 100. Roller shade 100 generally comprise a roller tube 101, shade material 104, and a hem bar 102. During installation, the roller shade 100 may be mounted on the ceiling, on a wall, or within window jambs between a first and second mounting brackets 115a and 115b. Shade material 104 is connected at its top end to the roller tube 101 and at its bottom end to the hem bar 102. Shade material 104 wraps around the roller tube 101 and is unraveled from the roller tube 101 to cover a window, a door, a wall opening, or the like. In various embodiments, the shade material 104 comprises fabric, plastic, vinyl, or other materials known to those skilled in the art. According to an embodiment, the shade material 104 may comprise a first vertical layer 116 connected to a second parallel vertical layer 117 via a plurality of horizontal vanes 118. According to an embodiment, first and second vertical layers 116 and 117 may comprise sheer material and horizontal vanes 118 may comprise opaque material, although other materials with different combinations of translucency or transmissivity may be utilized. Such shade material 104 rolls off the roller tube 101 with the first vertical layer 116 positioned substantially against the second vertical layer 117 with all the vanes 118 folded up. Once the entire length of the shade material 104 is rolled down (as shown in FIG. 1), the vanes 118 may be tilted out by further rotation of the roller tube 101.

Roller tube 101 is generally cylindrical in shape and laterally extends from a first end 108a to a second end 108b along longitudinal axis 111. The roller tube 101 may comprise one or more recessed channels 120 in its outer surface that extend from the first end 108a to the second end 108b of the roller tube 101 along longitudinal axis 111. For example, two channels 120 may be used to retain the shade material 104 as shown in FIG. 1. Each channel 120 may retain one of the vertical layers 116/117 of the shade material 104 via a retaining member 121. According to an embodiment, the channels 120 are located about 180 degrees from each other on opposite sides of the roller tube 101.

The roller tube 101 may be connected to an idler assembly 105 at its first end 108a. The idler assembly 105 may comprise an idler pin 106 and an idler body 107. The idler body 107 may be rotatably connected about the idler pin 106 via ball bearings therein (not shown). It is inserted into the roller tube 101 and is operably connected to the roller tube 101 such that rotation of the idler body 107 also rotates the roller tube 101. The idler pin 106 may include a pin tip 113 disposed on the terminal end of the idler pin 106 to attach the roller shade 100 to the first mounting bracket 115a. In one embodiment, the idler body 107 may comprise similar configuration to the idler body having a counterbalancing assembly disclosed in U.S. Pat. No. 9,631,425, issued on Apr. 25, 2017, and titled "Roller Shade with a Pretensioned Spring a Method for Pretensioning the Spring," the entire contents of which are hereby incorporated by reference.

The second end 108b of the roller tube 102 receives a motor drive unit 110. The motor drive unit 110 may comprise a motor control module 112, a motor 114, a crown adapter 109, and a drive wheel 119. The motor drive unit 110 may be inserted within the roller tube 102 at the second end 108b. The motor control module 112 operates to control the motor 114, directing the operation of the motor 114, including its direction, speed, and position. The motor control module 112 comprises fully integrated electronics. Power can be supplied to the motor control module 112 through a power cord 128 by connecting a terminal block 134 to a dedicated power supply (not shown), such as the CSA-PWS40 or CSA-PWS10S-HUB-ENET power supplies, available from Crestron Electronics, Inc. of Rockleigh, N.J. In another embodiment, the motor control module 112 may be battery operated. Motor control module 112 can further comprise a local user interface 135, such as a three-button interface, that allows users to test the roller shade 100 after installation and also to initiate the automatic limit detection mode. Furthermore, the motor control module 112 may comprise a light indicator 133, such as a multicolor light emitting diode (LED), for indicating the motor status.

The motor 114 may comprise a brushless direct current (BLDC) electric motor. In another embodiment, the motor 114 comprises a brushed DC motor, or any other motor known in the art. The drive wheel 119 is connected to the output shaft of the motor 114 to rotate the roller tube 101. The crown adapter 109 and drive wheel 119 are generally cylindrical in shape and are inserted into and operably connected to roller tube 101 at its second end 108b. Crown adapter 109 and drive wheel 119 comprise a plurality of channels 122 extending circumferentially about their external surfaces. Channels 122 mate with complementary projections radially extending from an inner surface of roller tube 101 such that crown adapter 109, drive wheel 119, and roller tube 101 rotate together during operation. Crown adapter 109 can further comprise a plurality of teeth 125 extending circumferentially about its external surface to form a friction fit between the crown adapter 109 and the inner surface of the roller tube 101. Crown adapter 109 can further comprise a flange 126 radially extending therefrom. Flange 126 prevents the crown adapter 109 from sliding entirely into the roller tube 101. The crown adapter 109 removably and releasably couples the motor drive unit 110 to the roller tube 101. The motor drive unit 110 may comprise similar configuration to the CSM-QMTDC-163-1 series motors, available from Crestron Electronics, Inc. of Rockleigh, N.J. The Crestron® CSM-QMTDC-163-1 series motors utilizes the quiet, precision-controlled Quiet Motor Technology to control the movement of the shade, keep track of the shade's position, and adjust the shade to the user's desired preset positions.

During installation, the roller shade 100 is mounted on or in a window between the first and second mounting brackets 115a and 115b. The roller shade 100 may first be mounted to the first mounting bracket 115a by inserting the idler pin tip 113 into a keyhole 103 of the first mounting bracket 115a. The roller shade 100 may then be mounted to the second mounting bracket 115b by snapping the motor drive unit 110 to the second mounting bracket 115b or coupling the motor drive unit 110 to the second mounting bracket 115b using screws. The mounting brackets 115a and 115b can comprise similar configuration to the CSS-DECOR3 QMT®3 Series Décor Shade Hardware, available from Crestron Electronics, Inc. of Rockleigh, N.J. Other types of brackets may be utilized without departing from the scope of the present embodiments.

In operation, the roller shade 100 is rolled down or lowered and rolled up or raised via the motor drive unit 110. Particularly, the motor 114 drives the drive wheel 119, which in turn engages and rotates the roller tube 101; and the roller tube 101 engages and rotates the crown adapter 109 and idler body 107 with respect to the motor 114, while the motor 114 and motor control module 112 remain stationary. As a result, the shade material 104 may be lowered from an opened or rolled up position, when substantially the entire shade material 104 is wrapped about the roller tube 101, to a closed or rolled down position, when the shade material 104 is substantially unraveled. The motor control module 112 stores different positions or limits of the roller shade 100 for it to operate properly, including for example an upper limit, a lower tilt closed limit, and a lower tilt open limit. FIGS. 3A-3D, illustrate different positions of a horizontal sheers style roller shade 100. In FIG. 3A the roller shade 100 is in a raised position where shade material 104 is fully opened and substantially fully rolled about the roller tube 101, representing the upper limit. FIG. 3B illustrates the roller shade 100 in a lowered position with closed vanes 118, representing the lower tilt closed limit where the shade material 104 is fully lowered or unraveled from the roller tube 101 but without opening the vanes 118. In operation, the roller shade is rolled up to an opened position and roller down to a closed position between the upper limit (FIG. 3A) and the lower tilt closed limit (FIG. 3B). Further rotation of the roller tube 101 in the lower direction causes the second vertical layer 117 to move away from the first vertical layer 116 thereby tilting and opening the vanes 118 as shown in FIG. 3C. The roller tube 101 is generally rotated until the vanes 118 are fully opened as shown in FIG. 3D, representing the lower tilt open limit. In operation, the vanes 118 can be tilted up and down from closed to opened position between the lower tilt closed limit (FIG. 3B) and the lower tilt open limit (FIG. 3D).

FIG. 2 is an illustrative block diagram 200 of the motor drive unit 110 according to one embodiment. The drive unit 110 may comprise the motor 114 and the motor control module 112. The motor control module 112 can comprise a controller 204, a memory 206, a communication interface 210, a user interface 135, and a light indicator 133.

The controller 204 can represent one or more processors such as microprocessors, and the microprocessors can be "general purpose" microprocessors, a combination of general and special purpose microprocessors, or application specific integrated circuits (ASICs). The controller 204 can provide processing capability to execute an operating system, run various applications, and/or provide processing for one or more of the techniques and functions described herein. For example, the controller 204 can process various commands and perform operations, such as controlling the direction, position, and speed of the motor 114.

According to an embodiment, the controller 204 may comprise a plurality of microcontrollers. A first microcontroller may be designated as the master microcontroller that handles network traffic, external user interface, application logic, and will keep high level view of the motion state. A second microcontroller may be a slave microcontroller that communicates with the master microcontroller and handles controlling the motor 114 with Hall Effect sensors feedback. This second microcontroller may keep a low level motion state and perform dedicated tasks, such as motor position tracking, motor communication control, current intensity feedback, overcurrent monitoring by constantly reading the Hall Effect sensor in real time, or the like. However, a single or any number of microcontrollers may be utilized.

The motor control module 112 can further include a memory 206 communicably coupled to the controller 204. The memory 206 may store information accessible by the controller 204, including instructions for execution by the controller 204. The memory 206 can represent nonvolatile memory, such as read-only memory (ROM) or Flash memory, or can also include volatile memory such as random-access memory (RAM). In buffering or caching data related to operations of the controller 204, memory 206 can store data associated with applications running on the controller 204.

An external power supply 202 can provide power to the circuit of the motor control module 112, and in turn the motor 114. The power supply 202 may be connected to a voltage line for receiving an electric alternating current (AC) power signal from an AC mains power source. The power supply 202 may comprise circuit components configured for converting the incoming AC power signal to a direct current (DC) power signal. In another embodiment, the controller 110 may be connected to an external power supply for receiving a DC power signal. In another embodiment, the motor drive unit 110 may comprise an internal power supply, such as batteries.

In an embodiment, the controller 110 may comprise a user interface 135, such one or more buttons, configured for enabling configuration of the motor drive unit 110 as well as receiving position control commands directly from a user. The user interface 135 may further comprise a user interface 135 such one or more light indicators, for example light emitting diodes (LED), to provide feedback to the status of the roller shade 100.

In another embodiment, motor control module 112 further comprises a communication interface 210, such as a wired or a wireless interface, configured for receiving control commands from an external control point. The wireless interface may be configured for bidirectional wireless communication with other electronic devices over a wireless network. The wireless network interface may comprise a radio frequency (RF) transceiver configured for bidirectional wireless communication using wireless communication protocols, such as the ZigBee® protocol, the infiNET EX® protocol from Crestron Electronics, Inc. of Rockleigh, N.J., or the like. In another embodiment, the wireless interface may in addition or alternately comprise an infrared (IR) interface.

The wired interface 210 may be configured for bidirectional communication with other devices over a wired network. The wired interface 210 can represent, for example, an Ethernet or a Cresnet® port. Cresnet® provides a network wiring solution for Crestron® keypads, lighting controls, thermostats, and other devices. The Cresnet® bus offers wiring and configuration, carrying bidirectional communication and 24 VDC power to each device over a simple 4-conductor cable.

The control commands received by the motor control module 112 may be a direct user input from the user interface 135 or a wired or wireless signal from an external control point. For example, the controller 204 may receive a control command from a wall-mounted button panel or a touch-panel in response to a button actuation or similar action by the user. Control commands may also originate from a signal generator such as a timer or a sensor. In an embodiment, a timer may be configured for transmitting a control input to the controller 110 at a predetermined time. The timer may be set according to personal preferences or for security reasons. In another embodiment, a light sensor may be configured for transmitting a control input to the controller 110 in response to sensing a predetermined level of sunlight.

In various aspects of the embodiments, the interface 210 and/or power supply 202 can comprise a Power over Ethernet (PoE) interface. The motor control module 112 can receive both the electric power signal and the control input from a network through the PoE interface. For example, the PoE interface may be connected through category 5 cable (CAT5) to a local area network (LAN) which contains both a power supply and multiple control points and signal generators. Additionally, through the PoE interface, the controller 110 may interface with the internet and receive control inputs remotely, such as from a homeowner running an application on a smart phone.

The motor drive unit 110 may further comprise one or more Hall Effect sensors 207 connected to the motor 114 and configured for determining the direction, speed, and position of the motor's shaft. Each Hall Effect sensor 207 may comprise a transducer that varies its output voltage in response to a magnetic field. The controller 204 may employ the information provided by the Hall Effect sensors 207 as a feedback for control of the motor 114.

The controller 110 further comprises a current sensing circuit 208 configured for sensing the current drawn by the motor 114. According to an embodiment, the current sensing circuit 208 may comprise a current sense resistor and an amplifier along with a low pass filter. However, other type of current sensing components may be utilized. For example, the current sensing circuit 208 may comprise a Hall Effect sensor for measuring current levels. The controller 204 may employ the information provided by current sensing circuit 208 as a feedback for control of the motor 114 as well as for automatic limit detection as described below.

The present embodiments pertain to systems, methods, and modes for automatically detecting at least one tilting limit for horizontal sheers style roller shades. Beneficially, automatic detection of the tilting limits according to the present embodiments yields more accurate and consistent limit settings because these limits are not based on subjective observation. This will allow side by side shade installations to uniformly operate and track with each other. In addition, the present embodiments allow for automatic limit detection irrespective of the size of the roller shade, including the radius and length of the roller shade, the type, width, length, thickness and weight of the shade material, and the size and weight of the hem bar.

FIG. 4 is a flowchart 400 illustrating the steps for a method of automatically detecting and setting one or more of the lower tilt limits, such as the lower open tilt limit (FIG. 3D) and the lower closed tilt limit (FIG. 3B), for a horizontal sheers style roller shade according to one embodiment. Initially, in step 402 the controller 204 receives a command to start or initiate the auto limit detection mode. The method shown in FIG. 4 may be initiated during configuration of the horizontal sheers style roller shade 100 at the factory, after installation at the installation site, after each power up of the controller 204, upon receipt of a command to perform auto limit set through the user interface 135 of the controller 204, in response to a reset command received from a user, if any of the limits have been changed, or the like. In response to any such occurrence, any previously stored automatically determined limits may be cleared to zero.

In step 404, the shade material 104 may be adjusted to an opened position to set the upper limit as shown in FIG. 3A. For example, the user may utilize the user interface 135 to raise or slightly lower the shade material 104 to a desired position where the shade material 104 is fully raised or opened and is substantially wrapped about the roller tube 101. However, the upper limit may also be set where the hem bar 102 hangs at some distance below the roller tube 101, depending on the installation, for example if a fascia is used. The controller 204 may store the upper limit in memory 206.

In step 406, the user may command the controller 204 to drive the motor 114 in a first or the lower direction until the shade material 104 is lowered and the vanes 118 are opened. According to one embodiment, the user may be directed to utilize the user interface 135 to lower the shade material 104 all the way down and to further rotate the roller tube 101 to tilt the vanes 118 until the vanes 118 are fully opened as shown in FIG. 3D. While FIG. 3D illustrates the hem bar 102 in a substantially horizontal position, it should be understood that the hem bar 102 may be instead in a tilted position when the vanes 118 are fully opened. The controller 204 may store this position as the lower tilt open limit in memory 206. According to another embodiment, this position is not recorded by the controller 204 as a set limit, but is later automatically determined as described below with reference to step 418.

In step 408, the controller 204 may generate a motor control signal to drive the motor 114 during the auto limit detection mode. According to an embodiment, this motor control signal is different than the motor control signal used to drive the motor 114 during normal operation of the roller shade 100, i.e., after the limits are set. Namely, this motor control signal may be adapted to run the motor 114 as slow as possible such that small torque fluctuations can be detected. According to an embodiment the motor control signal is generated using a trapezoidal commutation adopted to run the output shaft of the motor, for example at 5-10 RPM. Although in other embodiments sinusoidal commutation and different speeds may be utilized.

In step 410, the controller 204 would then drive the motor 114 according to the generated motor control signal in a second or the raise direction to raise the shade material 104. Referring to FIG. 3D, as the motor 114 rotates the roller tube 101 in the raise direction, the vanes 118 will slowly tilt from an opened position in FIG. 3D to a closed position as shown in FIG. 3C until they are fully closed as shown in FIG. 3B, at which point instead of being tilted the shade material 104 will start to rise. In step 412, as the motor 114 rotates the roller tube 101 in a raise direction, the controller 204 will detect and observe current levels via the current sensing circuit 208. In step 414, the controller 204 observes the current level profile. For example, the controller 204 may monitor the shape of the current level profile by plotting the current levels on a chart or determining the slope of the current level profile. In step 416, the controller 204 is adapted to detect a change in the current level profile.

Referring to FIG. 6, there is shown a diagram illustrating a current level curve 600 comprising current levels detected by the current sensing circuit 208 during shade travel. Particularly, FIG. 6 illustrates sensed current levels of a roller shade comprising a clutch-based motor 114. In a clutch based motor, during lowering or tilting of the shade material 104 and hem bar 102, the sensed or detected current levels are relatively flat. However, during lifting of the shade material 104 and hem bar 102 the sensed or detected current levels will increase. These changes in current draws can be detected to determine the position of the shade material 104 and hem bar 102. According to an embodiment, the hem bar 102 comprises some limited weight to assist in detecting these changes in current draws. While the present embodiments are illustrated using a clutch based motor, the limit detection techniques described herein can also be applied to clutchless motors. While these clutchless motors will yield different current profiles, with more noise, it is still possible to detect changes in current levels exerted on the motor 114 based on the position of the shade material 104 and hem bar 102.

In FIG. 6, section 615 illustrates the current levels detected when motor 114 is driven in the second direction causing the shade material 104 and hem bar 102 to tilt and close from FIG. 3D to FIG. 3B. As illustrated, while the vanes 118 and hem bar 102 are tilted from FIG. 3D to FIG. 3C, the motor 114 will experience a relatively flat torque exertion, and thereby a relatively flat current draw 615. Section 617 illustrates the current levels detected when the vanes 118 are fully closed and the shade material 104 and hem bar 102 start to lift as shown in FIG. 3B. As soon as the motor 114 will start lifting or pulling up the shade material 104 and the ham bar 102 as shown in FIG. 3B, a fairly noticeable increase in torque and thereby current draw 617 will be exerted on the motor 114. This change in torque will be detected by the current sensing circuit 208, which senses current draw changes as the torque increases or decrease.

Accordingly, during tilting of the vanes 118, the current level will have a relatively flat current draw 615, i.e., it will comprise a first slope, while during lifting of the shade material 104 and the hem bar 102 the current draw 617 will increase, i.e., it will comprise a second slope. According to an embodiment, the controller 204 can be configured to detect a point of change 616 in the shape of the current level profile, and more particularly change in the slope of the current level profile. According to a further embodiment, the controller 204 may be configured to detect a point of change 616 in the current level profile when the change exceeds a change threshold, for example, when the current level or the slope changes by some percentage amount. According to an embodiment, the controller 204 drives the motor 114 until detecting the change 616 or until reaching a predetermined period of time or revolutions. If no change is detected, the controller 204 may issue an error signal via the light indicator 133 to repeat the auto limit detection process.

In step 418, the controller 204 can use the point of detected change 616 to set one or more of the lower tilt limits. The controller 204 can directly set the point of detected change 616 as the lower tilt closed limit (FIG. 3B). According to another embodiment, if the lower tilt open limit was not previously set as discussed above with reference to step 406, the controller 204 can also use the point of detected change 616 to set the lower tilt open limit by adding a predetermined number of tilt units to the point of detected change, for example about one half of a roller tube 101 revolution. The predetermined number of tilt units may be stored in the memory 206 as a number and/or a fraction of the motor's output shaft rotations.

According to a further embodiment, the controller 204 can repeatedly raise and lower the shade material 102 and hem bar 104 a predetermined number of times to detect a plurality of changes in the current level profile and use an average value of the detected changes in the current level profile to set at least one of the lower tilt limits. For example, after detecting the change 616 in the current level profile in step 416, the controller 204 can drive the motor 114 in the first direction a predetermined number of revolutions from the detected change 616 to lower the shade material 102 and hem bar 104 back to the lowered position with open vanes shown in FIG. 3D. The controller 204 may then repeat steps 408 through 416 to detect the next point of change in the current level profile. The controller 204 can reiterate this process a predetermined number of times and average the detected changes in the current level profiles.

FIG. 5 is a flowchart 500 illustrating the steps for a method of automatically detecting and setting the lower tilt open limit as well as the lower tilt closed limit for a horizontal sheers style roller shade according to another embodiment. Initially, in step 502 the controller 204 receives a command to start or initiate the auto limit detection mode. In step 504, the shade material 104 may be adjusted to an opened position to set the upper limit as shown in FIG. 3A. For example, the user may utilize the user interface 135 to raise or slightly lower the shade material 104 to a desired position. At this position, the shade material 104 may be substantially wrapped about the roller 101 or may be hanging at some distance below the roller tube 101, depending on the installation. The controller 204 may store the upper limit in memory 206.

In step 506, the controller 204 may generate a motor control signal to drive the motor 114 during the auto limit detection mode, such as a trapezoidal control signal as discussed above. In step 508, the controller 204 may drive the motor 114 according to the generated motor control signal in a first or lower direction to lower the shade material 104 from the set upper limit. As the shade material 104 travels, the controller 204 may detect current levels in step 510 and observe the current level profile in step 512 as discussed above. Referring to FIG. 3A, the shade material 104 will lower all the way down as shown in FIG. 3B, then the vanes will start tilting to an opened position as shown in FIGS. 3C and 3D. As the roller tube 101 continues to rotate, the vanes 118 will start tilting to a closed position in a reverse direction as shown in FIG. 3E until they eventually fully close as shown in FIG. 3F. As shown in FIG. 6, the current levels of motor 114 during transition from FIG. 3A to FIG. 3F, i.e., during lowering and tilting, would generally comprise a substantially flat or shallow slope as shown in current draw section 605. As the motor 114 continues to rotate, the motor 114 will start lifting the shade material 104 as shown in FIG. 3F. The weight of the shade material 104 and the hem bar 102 will increase the torque exerted on the motor 114 and thereby increase the detected current levels as shown in current draw section 607 in FIG. 6. During this transition, i.e., during lifting, the controller 204 will detect a first change 606 in the current level profile in step 514. According to an embodiment, the controller 204 may be configured to detect a change 606 when the change exceeds a change threshold, for example, when the slope changes by some percentage amount.

After detecting the first change 606 in the current level profile, the controller 204 will stop the motor 114 and then drive the motor 114 according to the generated motor control signal in a reverse or second direction to raise the shade material 104 in step 516. Section 610 in FIG. 6 illustrates current levels drawn when the motor 114 reverses direction of travel. According to an embodiment, these current levels 610 are disregarded by the controller 204. As shown in FIG. 3F through FIG. 3D, after changing direction, the shade material 104 will lower and the vanes will start to open, then as the vanes 118 continue to tilt they will start to close in an opposite direction as shown in FIG. 3C until they are fully closed and the shade material 104 and hem bar 102 will again start to lift as shown in FIGS. 3B and 3A. As shown in section 615 in FIG. 6, the current levels of motor 114 during transition from FIG. 3F to FIG. 3B, i.e., during lowering and tilting, would generally comprise a substantially flat or shallow slope. As the shade material 104 and hem bar 102 will start to lift, the weight of the shade material 104 and the hem bar 102 will increase the torque exerted on the motor 114 and thereby increase the detected current levels as shown in current draw section 617 in FIG. 6. In step 518, the controller 104 will detect the current levels and observe the current level profile in step 520 until it detects a second change 616 in the current level profile in step 522 at the point when the shade material 104 and the hem bar 102 start to lift (FIG. 3B). According to an embodiment, the controller 204 may be configured to detect a change when the change exceeds a change threshold, for example, when the slope changes by some percentage amount.

According to an embodiment the controller 204 drives the motor 114 in each direction, both the lower and raise directions, until it detects the first and the second change or until reaching predetermined time periods or revolutions. If no changes are detected, the controller 204 may issue an error signal via the light indicator 133 to repeat the auto limit detection process.

In step 524, the controller 204 can use the first point of detected change 606 and/or the second point of detected change 616 to set the lower tilt open limit (FIG. 3D) and the lower tilt closed limit (FIG. 3B). According to one embodiment, the controller 204 can use the second point of detected change 616 as the lower tilt closed limit (FIG. 3B). The controller 204 can use either one or both the first point of change 606 and second point of change 616 to set the lower tilt open limit (FIG. 3D). For example, the controller 204 can set the lower tilt open limit by adding a predetermined number of tilt units to the second point of detected change 616, for example one half of a roller tube 101 revolution. The controller 204 can also set the lower tilt open limit by subtracting a predetermined number of tilt units from the first point of detected change 606, for example one half of a roller tube 101 revolution. The first point of detected change 606 will generally not be used as a preset limit as this position, as shown in FIG. 3F, is not typically an operable position for the roller shade 100. In yet another embodiment, the controller 204 can set the lower tilt open limit (FIG. 3D)

as the midpoint or some predetermined percentage point between the first point of change 606 and the second point of change 616. The determined lower tilt open limit and the lower tilt closed limit may be stored in memory 206.

According to another embodiment, the controller 204 can use the first point of detected change 606 to set the lower tilt open limit as well as the lower tilt closed limit by subtracting predetermined number of tilt units from the first point of detected change 606, for example one half of a roller tube 101 revolution for the lower tilt open limit and one roller tube 101 revolution for the lower tilt closed limit. In such an embodiment, the controller 204 does not need to execute steps 516 through 522 to find the second point of detected change 616.

In yet another embodiment, the controller 204 can reiterate steps 508 through 522 a predetermine number of times, for example about three times, to repeatedly tilt and raise the shade material 102 and hem bar 104 in each direction. For example, after completing step 522, the controller 204 can go back to step 508 to again reverse the motor 114 and drive it in the first direction. The controller 204 can then detect a first set of changes and a second set of changes in the current level profile for each direction of travel. The controller 204 can average the first set of changes to determine the first point of change in the current level profile and similarly average the second set of changes to determine the second point of change in the current level profile. The controller 204 can use these first and second points of averaged changes in step 524 to set the lower tilt open limit and the lower tilt closed limit as discussed above.

According to another embodiment, instead of averaging the first set of changes and the second set of changes, the controller 204 may correlate each set of first and second points of detected change to a predetermined number of tilt units. Particularly, for each roller shade 100 the number of tilt units, or in other words a number and/or a fraction of the motor's output shaft rotations, between the points where the shade material 104 and hem bar 102 will start to lift in each direction (i.e., the number/fraction of revolutions between FIG. 3B and FIG. 3F) is a constant value. This predetermined number of tilt units is based on the tube 101 diameter and the distance between the layers of shade material 104. This predetermined number of tilt units can be stored in memory 206. The controller 204 may detect a plurality of sets of first and second points of change, determine the number tilt units between each detected set of first and second points of change, and correlate the determined number of tilt units with the stored predetermined number of tilt units. The controller 204 may select the set of first and second points of change with a number of tilt units between them that match as close as possible to the stored predetermined number of tilt units. This will help to produce more accurate results.

The stored upper limit, lower tilt open limit, and lower tilt closed limit can be used by the controller 204 during normal operation to move the shade material 104 in response to control commands. For example, the controller 204 can drive the motor 114 within the regular shade region, between the upper limit (FIG. 3A) and the lower tilt closed limit (FIG. 3B), to lower or raise the shade material 104. In addition, the controller 204 can drive the motor 114 within the tilt region, between the lower tilt closed limit (FIG. 3B) and the lower tilt open limit (FIG. 3D) to open or close the vanes 118. According to an embodiment, while in the tilt region, the shade material 104 may be moving at half the speed than the normal speed used for lowering or raising the shade material 104, for example with the motor output shaft moving at about 10 revolutions per minute (RPM).

Industrial Applicability

The disclosed embodiments provide a system, software, and a method for automatically detecting at least one tilting limit for horizontal sheers style roller shade. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details. Rotate Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:
1. A horizontal sheers style roller shade comprising:
a roller tube;

a shade material attached to the roller tube and comprising a first vertical layer interconnected to a second vertical layer via a plurality of horizontal vanes;
a motor adapted to rotate the roller tube;
a current sensing circuit adapted to detect current levels of the motor;
a controller adapted to control the motor and comprising at least one memory, wherein the memory is adapted to store an upper limit, wherein the controller is adapted to automatically determine at least one lower limit by:
driving the motor in a first direction;
receiving current levels from the current sensing circuit;
observing current level profile of the received current levels;
detecting a point of change in the current level profile; and
using the point of change to set at least one of a lower tilt closed limit and a lower tilt open limit;
wherein during normal operation, the controller drives the motor between the upper limit and the lower tilt closed limit to raise or lower the shade material and between the lower tilt closed limit and the lower tilt open limit to open or close the vanes.

2. The horizontal sheers style roller shade of claim 1, wherein the upper limit is manually set by a user.

3. The horizontal sheers style roller shade of claim 1, wherein at the upper limit the shade material is substantially wrapped about the roller tube.

4. The horizontal sheers style roller shade of claim 1, wherein the controller drives the motor to determine the at least one lower limit at a speed lower than a speed used during normal operation of the roller shade.

5. The horizontal sheers style roller shade of claim 1, wherein the controller drives the motor to determine the at least one lower limit using trapezoidal commutation.

6. The horizontal sheers style roller shade of claim 1, wherein prior to driving the motor in the first direction, a user directs the controller to drive the motor to a position where the shade material is lowered and the vanes are substantially fully opened.

7. The horizontal sheers style roller shade of claim 6, wherein driving the motor in the first direction causes the vanes to close and the shade material to raise.

8. The horizontal sheers style roller shade of claim 6, wherein the controller stores the position directed by the user as the lower tilt open limit.

9. The horizontal sheers style roller shade of claim 6, wherein the controller sets the point of change as the lower tilt closed limit.

10. The horizontal sheers style roller shade of claim 9, wherein the controller sets the lower tilt open limit by adding a predetermined number of tilt units to the point of change.

11. The horizontal sheers style roller shade of claim 10, wherein the predetermined number of tilt units comprises about one half of the roller tube revolution.

12. The horizontal sheers style roller shade of claim 1, wherein the point of change represents a point where the vanes stop closing and the shade material starts to raise.

13. The horizontal sheers style roller shade of claim 1, wherein the controller observes the current level profile of the received current levels by monitoring a shape of the current level profile.

14. The horizontal sheers style roller shade of claim 1, wherein the controller observes the current level profile by plotting the received current levels on a chart and determining the shape of the current level profile.

15. The horizontal sheers style roller shade of claim 1, wherein the controller observes the current level profile by determining a slope of the current level profile and where the controller detects a change in the current level profile by detecting a change in the slope of the current level profile.

16. The horizontal sheers style roller shade of claim 15, wherein the controller detects a change in the current level profile when a change in the slope of the current level profile exceeds a change threshold.

17. The horizontal sheers style roller shade of claim 1, wherein the controller detects a change in the current level profile when the current level profile changes above a change threshold.

18. The horizontal sheers style roller shade of claim 1, wherein the controller is adapted to drive the motor in the first direction from the upper limit.

19. The horizontal sheers style roller shade of claim 18, wherein driving the motor in the first direction causes the shade material to lower until the shade material is fully unwrapped from the roller tube, the horizontal vanes get opened and then closed, and the shade material then raises.

20. The horizontal sheers style roller shade of claim 18, wherein the controller sets the lower tilt open limit by subtracting a first predetermined number of tilt units from the point of change and wherein the controller sets the lower tilt closed limit by subtracting a second predetermined number of tilt units from the point of change.

21. The horizontal sheers style roller shade of claim 20, wherein the first predetermined number of tilt units comprises about one half of the roller tube revolution and wherein the second predetermined number of tilt units comprises about one roller tube revolution.

22. The horizontal sheers style roller shade of claim 18, wherein the point of change comprises a first point of change, wherein after detecting the first point of change in the current level profile, the controller is further adapted to:
driving the motor in a second direction;
receiving current levels from the current sensing circuit;
observing current level profile of the received current levels; and
detecting a second point of change in the current level profile;
wherein the controller uses the first point of change and the second point of change to set the lower tilt closed limit and the lower tilt open limit.

23. The horizontal sheers style roller shade of claim 22, wherein the controller sets the lower tilt open limit by adding a predetermined number of tilt units to the second point of change.

24. The horizontal sheers style roller shade of claim 22, wherein the controller sets the lower tilt open limit by subtracting a predetermined number of tilt units from the first point of change.

25. The horizontal sheers style roller shade of claim 22, wherein the controller sets the lower tilt open limit at a predetermined point between the first and second points of change.

26. The horizontal sheers style roller shade of claim 25, wherein the controller sets the lower tilt open limit at a midpoint between the first and second points of change.

27. The horizontal sheers style roller shade of claim 22, wherein the controller is adapted to repeatedly drive the motor in the first and second directions to detect a set of first points of change and a set of second points of change in the current level profile and use an average of each set of first and second points of change to set the lower tilt closed limit and the lower tilt open limit.

28. The horizontal sheers style roller shade of claim 22, wherein the memory is further adapted to store a predetermined number of tilt units, and wherein the controller is further adapted to:
  repeatedly drive the motor in the first and second directions to detect a plurality of sets of first and second points of change;
  determine a number of tilt units between each set of first and second points of change; and
  use a set of first and second points of change with determined number of tilt units that correlates with the stored predetermined number of tilt units to set the lower tilt closed limit and the lower tilt open limit.

29. The horizontal sheers style roller shade of claim 1, wherein the controller is adapted to repeatedly drive the motor in the first direction to detect a plurality of points of change in the current level profile and use an average of the plurality of points of change to set at least one of the lower tilt closed limit and the lower tilt open limit.

30. A horizontal sheers style roller shade comprising:
  a roller tube;
  a shade material attached to the roller tube and comprising a first vertical layer interconnected to a second vertical layer via a plurality of horizontal vanes;
  a motor adapted to rotate the roller tube;
  a current sensing circuit adapted to detect current levels of the motor;
  a controller adapted to control the motor and comprising at least one memory, wherein the memory is adapted to store an upper limit manually set by a user, wherein the controller is adapted to automatically determine a lower tilt closed limit and a lower tilt open limit by:
    driving the motor from the upper limit in a first direction;
    receiving current levels from the current sensing circuit;
    observing current level profile of the received current levels;
    detecting a point of change in the current level profile; and
    using the point of change to set the lower tilt closed limit and the lower tilt open limit;
  wherein during normal operation, the controller drives the motor between the upper limit and the lower tilt closed limit to raise or lower the shade material and between the lower tilt closed limit and the lower tilt open limit to open or close the vanes.

31. A horizontal sheers style roller shade comprising:
  a roller tube;
  a shade material attached to the roller tube and comprising a first vertical layer interconnected to a second vertical layer via a plurality of horizontal vanes;
  a motor adapted to rotate the roller tube;
  a current sensing circuit adapted to detect current levels of the motor;
  a controller adapted to control the motor and comprising at least one memory, wherein the memory is adapted to store an upper limit manually set by a user, wherein the controller is adapted to automatically determine a lower tilt closed limit and a lower tilt open limit by:
    driving the motor from the upper limit in a first direction, and during travel in the first direction:
      receiving current levels from the current sensing circuit;
      observing current level profile of the receive current levels;
      detecting a first point of change in the current level profile;
    driving the motor in a second direction, and during travel in the second direction:
      receiving current levels from the current sensing circuit;
      observing current level profile of the received current levels;
      detecting a second point of change in the current level profile;
    using the first and the second points of change to set the lower tilt closed limit and the lower tilt open limit;
  wherein during normal operation, the controller drives the motor between the upper limit and the lower tilt closed limit to raise or lower the shade material and between the lower tilt closed limit and the lower tilt open limit to open or close the vanes.

32. A horizontal sheers style roller shade comprising:
  a roller tube;
  a shade material attached to the roller tube and comprising a first vertical layer interconnected to a second vertical layer via a plurality of horizontal vanes;
  a motor adapted to rotate the roller tube;
  a current sensing circuit adapted to detect current levels of the motor;
  a controller adapted to control the motor and comprising at least one memory, wherein the memory is adapted to store an upper limit and a lower tilt open limit manually set by a user, wherein the controller is adapted to automatically determine a lower tilt closed limit by:
    driving the motor in a first direction;
    receiving current levels from the current sensing circuit;
    observing current level profile of the received current levels;
    detecting a point of change in the current level profile; and
    using the point of change to set the lower tilt closed limit;
  wherein during normal operation, the controller drives the motor between the upper limit and the lower tilt closed limit to raise or lower the shade material and between the lower tilt closed limit and the lower tilt open limit to open or close the vanes.

33. A method of automatically determining at least one lower limit of a horizontal sheers style roller shade comprising a roller tube, a shade material attached to the roller tube and comprising a first vertical layer interconnected to a second vertical layer via a plurality of horizontal vanes, a motor adapted to rotate the roller tube, and a current sensing circuit adapted to detect current levels of the motor, wherein the method comprises the steps of:
  driving the motor in a first direction;
  receiving current levels from the current sensing circuit;
  observing current level profile of the received current levels;
  detecting a point of change in the current level profile;
  using the point of change to set at least one of a lower tilt closed limit and a lower tilt open limit;
  wherein during normal operation, driving the motor between the upper limit and the lower tilt closed limit to raise or lower the shade material and between the lower tilt closed limit and the lower tilt open limit to open or close the vanes.

34. A method of automatically determining at least one lower limit of a horizontal sheers style roller shade comprising a roller tube, a shade material attached to the roller tube and comprising a first vertical layer interconnected to a second vertical layer via a plurality of horizontal vanes, a motor adapted to rotate the roller tube, and a current sensing circuit adapted to detect current levels of the motor, wherein the method comprises the steps of:

storing an upper limit;

driving the motor from the upper limit in a first direction;

receiving current levels from the current sensing circuit;

observing current level profile of the received current levels;

detecting a point of change in the current level profile;

using the point of change to set the lower tilt closed limit and the lower tilt open limit;

wherein during normal operation, driving the motor between the upper limit and the lower tilt closed limit to raise or lower the shade material and between the lower tilt closed limit and the lower tilt open limit to open or close the vanes.

\* \* \* \* \*